(12) United States Patent
Albero et al.

(10) Patent No.: US 12,333,043 B2
(45) Date of Patent: Jun. 17, 2025

(54) EVENT BASED NETWORK MICRO-SEGMENTATION MODELING FOR USER AUTHENTICATED ACCESS TO DISTRIBUTED NETWORK SYSTEM SEGMENTS

(71) Applicant: BANK OF AMERICA CORPORATION, Charlotte, NC (US)

(72) Inventors: George Anthony Albero, Charlotte, NC (US); Michael Robert Young, Davidson, NC (US); Dustin Paul Stocks, Stallings, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 372 days.

(21) Appl. No.: 17/889,093

(22) Filed: Aug. 16, 2022

(65) Prior Publication Data

US 2024/0061950 A1 Feb. 22, 2024

(51) Int. Cl.
*G06F 21/00* (2013.01)
*G06F 21/62* (2013.01)
*G06F 40/20* (2020.01)

(52) U.S. Cl.
CPC .......... *G06F 21/6245* (2013.01); *G06F 40/20* (2020.01); *G06F 2221/2111* (2013.01); *G06F 2221/2141* (2013.01)

(58) Field of Classification Search
CPC ................ G06F 21/6245; G06F 40/20; G06F 2221/2111; G06F 2221/2141
See application file for complete search history.

(56) References Cited

U.S. PATENT DOCUMENTS

| | | |
|---|---|---|
| 8,909,569 B2 | 12/2014 | Spivack et al. |
| 9,189,538 B2 | 11/2015 | King et al. |
| 9,836,455 B2 | 12/2017 | Martens et al. |
| 10,275,516 B2 | 4/2019 | King et al. |
| 10,396,919 B1 | 8/2019 | O'Shea et al. |
| 10,671,076 B1 | 6/2020 | Kobilarov et al. |
| 10,692,163 B2 | 6/2020 | Eidelman et al. |
| 10,796,391 B2 | 10/2020 | Grom et al. |
| 10,850,728 B2 | 12/2020 | Shalev-Shwartz et al. |
| 10,861,320 B2 | 12/2020 | Martin et al. |
| 10,885,561 B2 | 1/2021 | Psota et al. |
| 11,082,487 B1 | 8/2021 | Jain et al. |
| 11,128,737 B1 * | 9/2021 | Fox .................. G06F 18/29 |
| 11,194,492 B2 | 12/2021 | Bedadala et al. |
| 11,551,803 B1 * | 1/2023 | Arazi .............. G06Q 30/0631 |
| 2018/0330281 A1 | 11/2018 | Teller et al. |
| 2019/0014153 A1 | 1/2019 | Lang et al. |

(Continued)

*Primary Examiner* — Kendall Dolly
(74) *Attorney, Agent, or Firm* — Moore & Van Allen PLLC; Nicholas C. Russell

(57) ABSTRACT

A system is provided for monitoring real-time data inputs across multiple channels, determining potential impacts to a network or entity policy taxonomy, and taking one or more automated, responsive actions based on determined impacts. In this way, the system described herein is able to optimize system processes and system protections on an enterprise-wide scale in response to current events, policy or regulation changes, or predicted measures taken by private or public entities that may necessitate adaptation of one or more workflow processes or technology taxonomies, either upstream or downstream of the system itself.

17 Claims, 2 Drawing Sheets

(56) References Cited

U.S. PATENT DOCUMENTS

| | | |
|---|---|---|
| 2019/0114549 A1 | 4/2019 | Olsher |
| 2019/0179300 A1 | 6/2019 | Cella et al. |
| 2019/0266627 A1 | 8/2019 | Lanxner et al. |
| 2020/0034665 A1 | 1/2020 | Ghanta et al. |
| 2020/0067776 A1* | 2/2020 | Williams ............ H04L 41/0876 |
| 2020/0410399 A1* | 12/2020 | Lang ........................ G06N 5/01 |
| 2021/0182688 A1* | 6/2021 | Mnih ...................... G06N 3/006 |
| 2021/0357508 A1 | 11/2021 | Elovici et al. |

\* cited by examiner

EVENT BASED NETWORK MICRO-SEGMENTATION MODELING FOR USER AUTHENTICATED ACCESS TO DISTRIBUTED NETWORK SYSTEM SEGMENTS

FIELD OF THE INVENTION

The present disclosure embraces a system for predicting, recognizing, and adapting the effects of real-time events as they relate to an enterprise workflow.

BACKGROUND

There is a need for a way to automatically and proactively identify potential impacts of one or more current events or policy changes on an enterprise-wide level. Current systems allow for analysis of technology stack changes or policy and regulation changes separately, whereas an ideal system could be enhanced via the use of machine learning and artificial intelligence in order to provide predictive and proactive feedback to an enterprise workflow.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for monitoring real-time data inputs across multiple channels, determining potential impacts to a network or entity policy taxonomy, and taking one or more automated, responsive actions based on determined impacts. In this way, the system described herein is able to optimize system processes and system protections on an enterprise-wide scale in response to current events, policy or regulation changes, or predicted measures taken by private or public entities that may necessitate adaptation of one or more workflow processes or technology taxonomies, either upstream or downstream of the system itself. The system is enhanced via the use of machine learning and artificial intelligence in order to provide predictive and proactive feedback to an enterprise workflow. As such, the system may effectively determine the combined effects of technology or policy changes in addition to providing recommendations for various updates in terms of workflow, process controls, data monitoring, or user access rights in response to identified changes.

Accordingly, embodiments of the present disclosure provide a system for monitoring real-time data inputs across multiple channels, determining potential impacts to a network or entity policy taxonomy, and taking one or more automated, responsive actions based on determined impacts. The system may comprise a memory device with computer-readable program code stored thereon; a communication device; and a processing device operatively coupled to the memory device and the communication device. The processing device may be configured to execute the computer-readable program code to continuously monitor one or more external intelligence data feeds; identify one or more events, sentiments, or policy changes as relevant to an entity workflow; access a process flow log to determine one or more process controls impacted by the identified one or more events, sentiments, or policy changes; and automate a responsive action or communication notifying one or more users of the one or more process controls impacted by the identified one or more events, sentiments, or policy changes.

In some embodiments, the processing device is further configured to automate a simulated process control environment to determine one or more auxiliary impacts caused by changing one of the one or more process controls.

In some embodiments, the identified one or more events, sentiments, or policy changes are determined based on contextual analysis of natural language via a machine learning engine.

In some embodiments, the responsive action further comprises generating a working group of one or more users identified as supervising one of the one or more process controls.

In some embodiments, the responsive action further comprises degrading or monitoring data transmissions with one or more third party entities based on location of the one or more third party entities in a particular region.

In some embodiments, the responsive action further comprises placing a restrictive hold on resource transfers to or from one or more resource accounts for a defined time period.

In some embodiments, the responsive active further comprises modifying user access permissions of one or more users to limit the users' access to one or more proprietary applications or confidential datastores.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
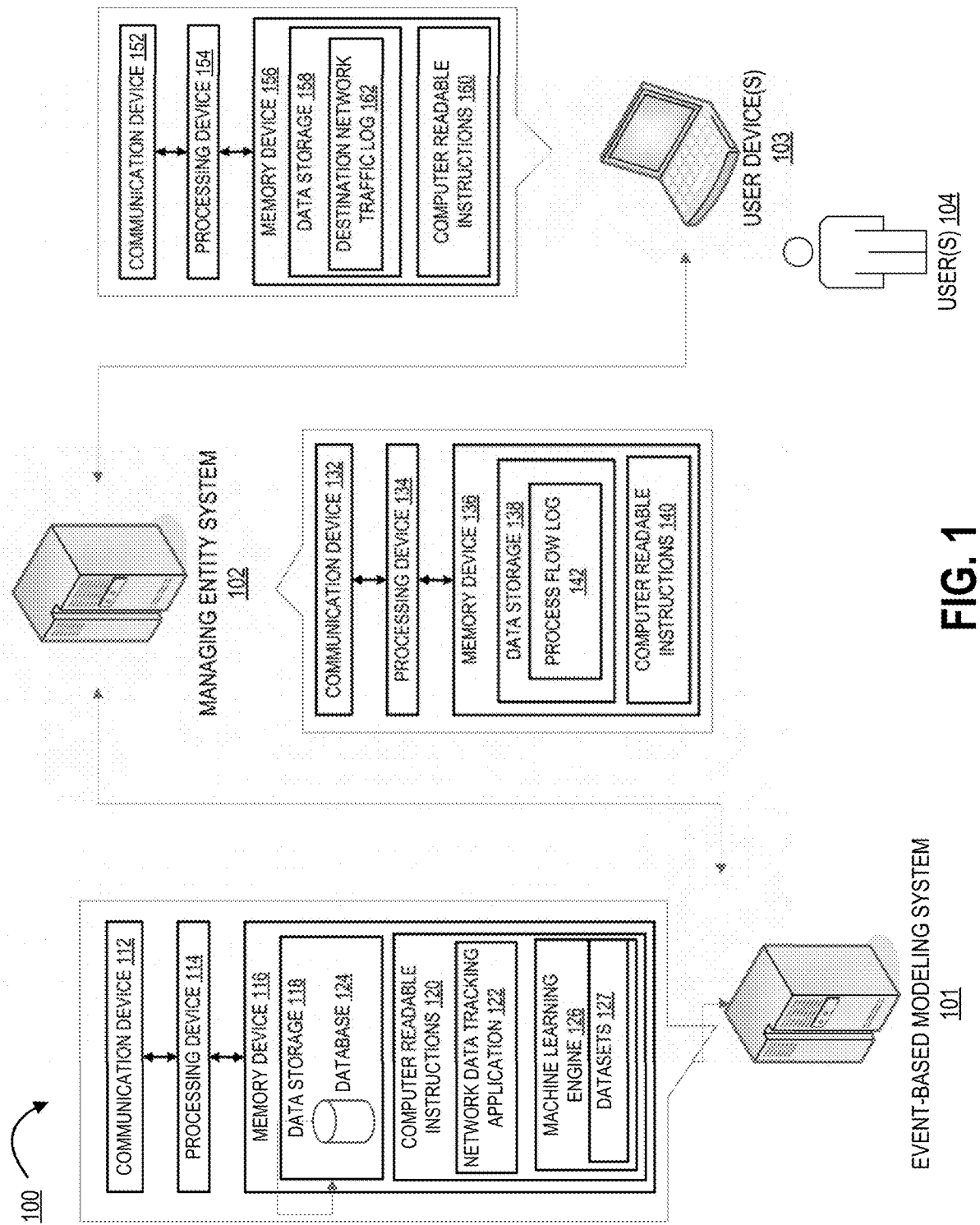
Figure 2:
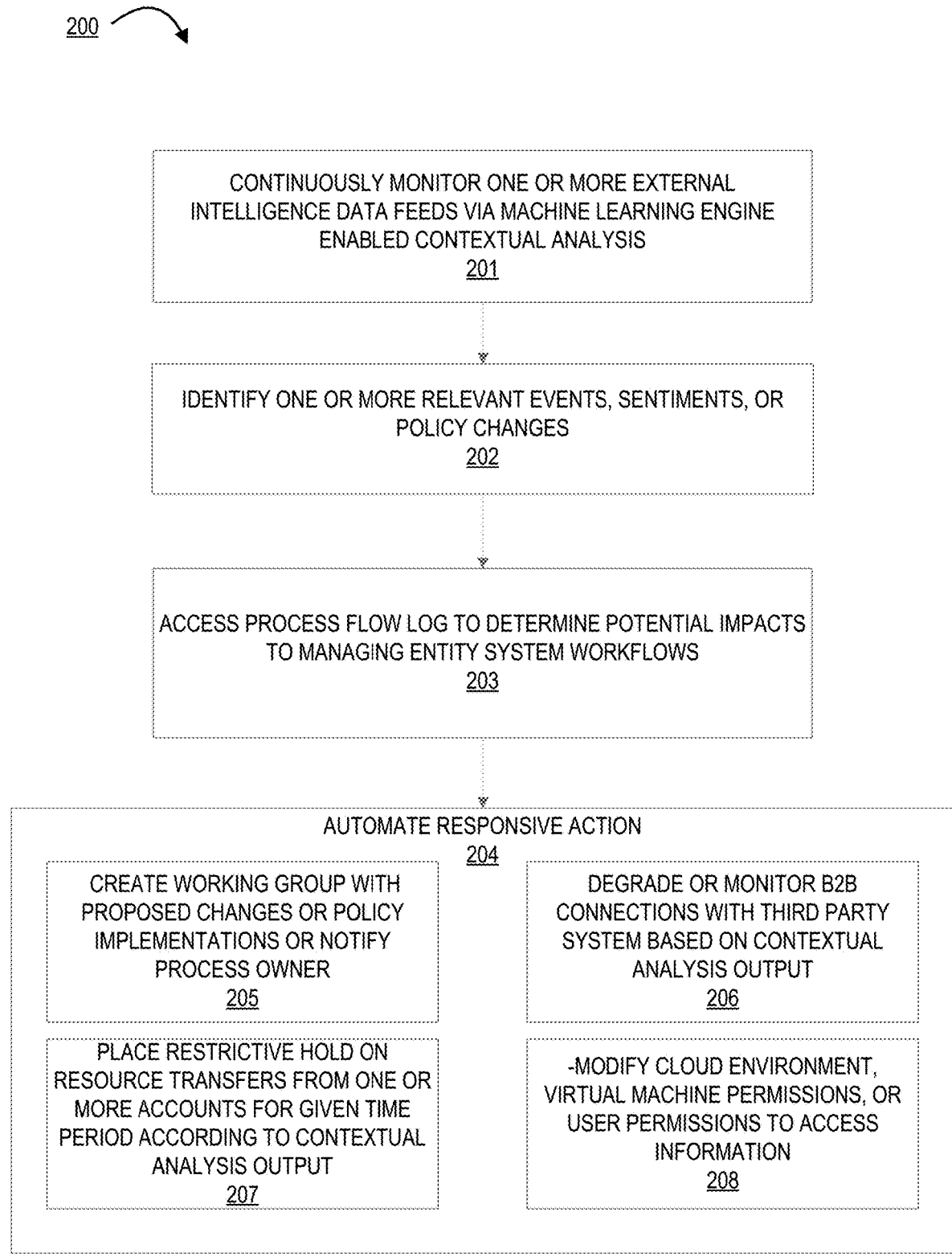

Having thus described embodiments of the invention in general terms, reference will now be made to the accompanying drawings, wherein:

FIG. 1 illustrates an operating environment for the event-based modeling system, in accordance with one embodiment of the present disclosure; and FIG. 2 illustrates a process flow for the event-based modeling system, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Working group" as used herein may refer to one or more users identified by the system as being associated with a work flow or system process which is impacted by one or more policy changes, current events, inferences, predictions, or the like that are either generated or identified as external factors by the system herein. In some embodiments, a working group may refer to a number of users which receive automated alerts regarding one or more determinations or recommendations from the system and who have the access rights and permissions to take action according to such determinations or recommendations.

"Artificial intelligence" (AI) as used herein may refer to the simulation of intelligence processes by neural networks. Specific applications of AI include expert systems, natural language processing, speech recognition, or the like. AI enabled models may be used to conduct sentiment or relevancy analyses according to data received by the system or retrieved by the system. "Neural network" as used herein may refer to a computer architecture modeled on the human mind, consisting of nodes connected to each other by links of differing strengths.

"Machine learning" as used herein may refer to the use and development of computer systems that are able to learn and adapt without following explicit instructions. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention.

"Policy" as used herein may refer to one or more internal policies of an entity which owns and manages the system described herein (the "managing entity"), or may refer to one or more policies of an external third party system which affects the managing entity.

The machine learning engine 366 may receive data from a plurality of sources and, using one or more machine learning algorithms, may generate one or more output statistics stored in the machine learning dataset(s) 368. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention. Data generated by the machine learning engine 366 may be utilized by the augmented display system 300 in order to inform recommendations for one or more users. For instance, machine learning engine 366 may identify that a certain percentage of users experienced increased productivity (as determined by interaction time with one or more applications associated with productivity) when implementing a certain augmented reality aspect via AR system 120, and may recommend those certain aspects to other similar users.

"Network traffic" as used herein may refer to the various types of data that may be received and transmitted across the network by computing systems within the network. Accordingly, "network traffic data" as used herein may refer to records or logs regarding and/or associated with the network traffic between computing systems within the network.

"Network segmentation" or "segmentation" as used herein may refer to a process for using physical or logical boundaries to separate hardware and/or software objects from one another within a network to create subsections of the network. Examples of segmentation methods or implements may include routers, switches, physical cable disconnects, wireless jammers, firewall rules, virtual local area networks (VLAN), and the like. Segmentation may be carried out at macro levels (e.g., data centers, geographic regions, or the like) and/or at the micro level (specific computing systems, hardware devices, and/or data).

Computing systems in a network environment may transmit and/or receive various types of data to and/or from one another and/or other computing systems that may exist outside of the network environment. For example, computing systems may transmit and/or receive entity-specific data, such as data associated with operations of the entity and/or entity system. Computing systems may also transmit and/or receive external data, such as via an RSS ("Really Simple Syndication") feed, or the like. In such scenarios, a specialized computing system may be utilized to identify how external data impacts the internal system, and may generate automated recommendations, predictions, or the like, and identify impacted users of these recommendations and predictions.

In this regard, the system as described herein provides a solution for monitoring real-time data inputs across multiple channels, determining potential impacts to a network or entity policy taxonomy, and taking one or more automated, responsive actions based on determined impacts. In this way, the system described herein is able to optimize system processes and system protections on an enterprise-wide scale in response to current events, policy or regulation changes, or predicted measures taken by private or public entities that may necessitate adaptation of one or more workflow processes or technology taxonomies, either upstream or downstream of the system itself. The system is enhanced via the use of machine learning and artificial intelligence in order to provide predictive and proactive feedback to an enterprise workflow. As such, the system may effectively determine the combined effects of technology or policy changes in addition to providing recommendations for various updates in terms of workflow, process controls, data monitoring, or user access rights in response to identified changes.

The system as a whole is directed to the proactive identification and response to changes in current events or situational circumstances which may affect entity processes or workflows. It is understood that changes in laws, rules, regulations, policies, and world events occurring could each potentially change processes and controls used upstream or downstream at an entity. The system receives real-time notifications or RSS feeds from governments, news feeds, or the like, to continually receive data associated with laws, rules, regulations, policies, and world event changes. The system uses AI enabled processes to conduct sentiment analysis to determine impact on overall entity environment and, in some instances, one or more specific impacted users. If one or more users, clients, customers, or the like, of the entity are determined as being affected by an identified change to policy, user access rights, data privileges, services, or the like may be altered by the system in order to proactively respond to potential issues. The system reviews the managing entity's workflow models and process interdependencies, creates a blueprint of such processes, and each element of the model is reviewed to determine if the change may impact user or third-party access rights based on the changes. The system performs mapping of the entity process and controls taxonomy.

For instance, a line of business of the managing entity may include various controls, processes, process functions, and various technologies, software, or channels of communication associated with the various technologies. Technologies and process functions may be shared across several lines of business or process flows within certain aspects of the managing entity. For instance, a commercial account or resource investing platform may share various software, technologies, or resource pools associated with a retail customer savings account platform. As such, if any changes in policy are identified which affect those technologies or processes, both lines of business may be notified of the policy change or recommended actions. In other instances, certain policies may affect one line of business and not another. For instance, a policy or regulation may be promulgated which restricts resource flow or requires additional reporting for only commercial trading resource accounts over a certain threshold amount. In other instances, the system may identify more singular focused policy changes or current events which may necessitate process flow adjustment. For instance, a conflict in a particular region may necessitate additional caution with interacting with certain accounts from those regions, may restrict resource flow from certain individuals, or the like, and the system may identify these current events and automatically determine recommended adjustments to user access privileges, resource availability, enforce higher degrees of required review prior to transacting resources, or the like. For instance, if the managing entity maintains an office with one or more employees in an affected region, the system may determine that it would be prudent to restrict user access privileges to certain sensitive information for employees in that region for a given time period when the conflict is ongoing, or the like.

An identification of an impactful change will allow the system to drive technology decisions based on the mapping of processes from an up and downstream taxonomy standpoint. This could be for slow changes in laws, rules, or regulations or instant changes based on world event occurrence. With this mapping, the system could dynamically perform micro-segmentation of networks and dynamically change user rights because of mapping. The system allows for dynamic changes to the user environment based on changes. The system may also perform a predictive analytic approach. The system may be able to input a potential future event, such as a change in a CEO or change in political figure potentially occurring in the future. The system may predict the impact based on these potential future events and present the changes or predicted effects on policy in a simulated environment, or "sandbox" approach.

Based on the network traffic data, the system may generate a network topology which maps the various types of network connections that were established across the computing systems in the network environment as well as the types of data that were transferred across such connections. The system may examine the network traffic logs to determine which types of data may be affected by certain related systems or processes and may store these identified codependences or process relationships in a process flow log in order to map out a blueprint of entity workflow data processes. In this way, the system may intelligently identify any auxiliary effects of certain impactful policy changes on one or more workflows, processes, or the like, within the managing entity.

In some embodiments, the system may perform a likelihood calculation of the various network connections and/or interactions to determine the which data stored in the network is likely to be affected by using historical data within the network traffic logs of affected computing systems. In addition to logs of the actual policy changes and effects, the system may calculate a likelihood score which indicates the likelihood that a policy change may traverse technology elements along a particular pathway. For instance, a File Transfer Protocol ("FTP") connection to transfer an executable file on port 21 from a file server to a desktop computer may have a relatively higher likelihood of containing entity-specific information (and accordingly, a higher likelihood score) than web traffic on port 80 from a web server to a desktop computer (which may have a relatively lower likelihood score).

In some embodiments, the likelihood score calculations may be dynamically adjusted using machine learning algorithms which may track actual traversals of policy changes to increase or decrease likelihood scores for certain data types according to the observed data. In some embodiments, the system may further incorporate information from external intelligence feeds (e.g., information on modes of infection and/or intended purposes of certain breach vectors) in generating the likelihood score. For example, the intelligence feed may indicate that a particular breach vector is commonly used to identify sets of usernames and passwords, and may be used in a particular region where there is an ongoing conflict with the region where the managing entity is based. Accordingly, data sets containing user passwords may have an increased likelihood score with respect to the identified breach vector, and the system may recommend restricting access to those certain vectors in that particular region, or for users in that particular region, based on the received external intelligence information.

An exemplary use case is provided for illustrative purposes. In one exemplary embodiment, the system may detect, based on external intelligence information received via an RSS feed, or the like, that a law or regulation has been passed which requires additional reporting requirements regarding usage of personal data. Based on the network topology, the system may generate a ranked list of network traffic data that may be most likely to be pertinent to the law or regulation. In this regard, the system may use external or internal intelligence feeds to calculate a probability of transmission of this data through certain types of network traffic and the various levels of encryption used to transmit this data. For example, the intelligence data may indicate that the data is entity-specific data used in a particular software application and is most likely to spread through file transfers on port 21 via an unencrypted channel, but is not transferred externally to any third party software or third party systems. As such, the system may recommend a review of the file transfer mechanism based on the nature of the data, and may recommend that the data be encrypted, or may further recommend that user access rights to this data be restricted in certain regions according to the law or regulation. For instance, if the law or regulation affects only customer data in certain states or regions, the system may take this into account and propose heightened security standards if data relates to users known to be located in those regulated regions.

Turning now to the figures, FIG. 1 illustrates an operating environment 100 for the event-based modeling system, in accordance with one embodiment of the present disclosure. In particular, FIG. 1 illustrates an event-based modeling system 101 that is operatively coupled, via a network, to a managing entity system 102 and/or a user device 103. In such a configuration, the event-based modeling system 101 may transmit information to and/or receive information from the managing entity system 102 and/or a user device 103. It should be understood that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts a managing entity system 102 and a user device 103, some embodiments may include multiple user devices 103 in the network environment. In addition, the managing entity system 102 may comprise a plurality of discrete computing devices and/or servers. Furthermore, it will be appreciated by those skilled in the art that network traffic may be bidirectional between computing systems. Additionally or alternatively, the user device 103 may be a separate computing system from the managing entity system 102 as depicted, or the user device 103 may be fully integrated within the same computing system as the managing entity system 102.

It should also be understood that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the event-based modeling system 101 is depicted as a single unit, the functions of the event-based modeling system 101 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the event-based modeling system 101 may be a networked server, desktop computer, laptop computer, routing device, or other type of computing system within the network environment which performs the processes for tracking network data, reading network traffic logs, generating and/or maintaining a network topology information, generating likelihood scores, implementing remediation processes including data packet generation and encryption, and the like, as described herein. Accordingly, the event-based modeling system 101 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 may use the communication device 112 to communicate with the network and other devices on the network, such as, but not limited to the managing entity system 102 and/or the user device 103. Accordingly, the communication device 112 generally comprises one or more hardware components such as a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise a database 124, which may comprise information regarding the topology of the network, information about various nodes within the network and/or the types of network traffic that may pass between such nodes, intelligence on vectors that may compromise the nodes, and the like. Accordingly, in one embodiment, the database 124 may comprise the network topology associated with the various computing systems in the network, the relationships between the computing systems (e.g., the types of data transmitted back and forth between the nodes), and the like. The database 124 may further comprise historical data regarding the monitored traffic within the network, which in turn may be used to drive the processes for generating likelihood scores for the data stored within the network, as described elsewhere herein. It should be understood that in alternative embodiments, the database 124 may be hosted on a separate computing system (e.g., a database server) instead of being hosted on the event-based modeling system 101. It is further understood that the database 124 may be populated with external intelligence data sourced from various third party news outlets, commercial systems, or the like, which the system may use to analyze and make determinations regarding important policy changes or recommended actions.

The memory device 116 may have computer-readable instructions 120 stored thereon, where the computer-readable instructions 120 may comprise a network traffic tracking application 122, which may comprise computer-executable program code which may instruct the processing device 114 to perform certain logic, data processing, and data storing functions of the application to accomplish the entity's objectives. For instance, the network traffic tracking application 122 may monitor the network traffic within the managing entity system 102 and between the managing entity system 102 and the user device 103, or other third party systems not shown, to identify or predict potential lateral movement of vectors that may affect data stored within the managing entity system 102 and/or the user device 103, or to gather external intelligence data which may be used to process and make determinations by a machine learning engine 126. In this regard, the network traffic tracking application 122 may pull data from the database 124 to perform likelihood calculations for each data set stored within the managing entity system 102 and the user device 103.

The machine learning engine 126 may receive data from a plurality of sources and, using one or more machine learning algorithms, may generate one or more output statistics stored in the machine learning dataset(s) 127. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention. Data generated by the machine learning engine 126 may be utilized by the event-based modeling system 101 in order to inform recommendations for one or more users or working groups affected by identified policy changes or current events.

As further illustrated in FIG. 1, the operating environment 100 may further comprise a managing entity system 102 in operative communication with the event-based modeling system 101. The managing entity system 102 may be a computing system such as a server or networked terminal, though it is within the scope of the disclosure for the managing entity system 102 to be one or more devices such as a desktop computer, laptop, IoT device, smartphone, tablet, single-board computer, or the like, or the managing entity system 102 may be one or more hardware or software elements of one of said devices (i.e. a software application, camera, microphone, and/or the like.)

The managing entity system 102 may comprise a processing device 134 operatively coupled to a communication device 132 and a memory device 136 having data storage 138 and computer readable instructions 140 stored thereon. The data storage 138 may comprise an origin process flow log 142, which may comprise a historical record of network traffic data sent and/or received by the upstream technology element 102. For instance, in embodiments in which the managing entity system 102 is a web server, the origin process flow log 142 may comprise a record of an incoming web data request on port 80 from the user device 103, and another record of outgoing web data to the user device 103.

In some embodiments, the operating environment 100 may further comprise a user device 103. The user device 103 may be a computing system within the network environment that may serve as the destination for network data transmitted from the managing entity system 102. In some embodiments, the user device 103 may be a computing system that is operated by a user 104, such as an administrator or employee of the entity. Accordingly, the user device 103 may be a computing system such as a desktop computer, laptop computer, smartphone or smart device, tablet, single board computer, or the like, though it is within the scope of the disclosure for the user device 103 to be any other kind of computing system as described herein (e.g., a "headless" computing system such as a server). Additionally or alternatively, the user device 103 may be a hardware or software element of one of said devices (i.e. a software application, input device, output device, and/or the like). The user device 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like) for interacting with the user 104.

In this regard, the user device 103 may comprise a processing device 154 operatively coupled to a communication device 152 and a memory device 156 comprising data storage 158 and computer readable instructions 160. The data storage 158 of the user device 103, similar to that of the managing entity system 102, may comprise a destination network traffic log 162 which may contain a historical log of data sent and/or received by the user device 103. Continuing the above example, the destination network traffic log 162 may contain a record indicating that the user device 103 has downloaded web data on port 80 from the managing entity system 102. By reading the origin process flow log 142 and the destination network traffic log 162, the event-based modeling system 101 may generate a topology of the network, identify transmitted data, calculate likelihood scores, and implement remediation processes on the managing entity system 102 and/or the user device 103 according to the calculated likelihood scores. Accordingly, in some embodiments, the event-based modeling system 101 may be configured to hook into the process command loop of the managing entity system 102 and/or the user device 103 to implement remediation steps (e.g., diving data into partial data packets, encrypting partial data packets, determining network locations for transmission of partial data packets and/or the like).

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the technology elements may access one or more databases or datastores (not shown) to search for and/or retrieve information related to the service provided by the entity. The technology elements may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

Each computing system in the operating environment 100 may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems. The event-based modeling system 101 may be in operative communication with a control system of a computing system to implement remediation steps (e.g., diving data into partial data packets, encrypting partial data packets, determining network locations for transmission of partial data packets and/or the like).

FIG. 2 illustrates a process flow 200 for tracking, predicting, and determining entity-wide process control effects and policy implementations, in accordance with some embodiments of the present disclosure. The process begins at block 201, where the system continuously monitors one or more external intelligence data feeds (via an RSS feed, or the like) and conducts a contextual analysis via the machine learning engine 126. In this regard, the system may conduct a natural language processing of multiple data feeds such as articles, press releases, headlines, published laws, regulations, or the like, in order to categorize information related to current events and conduct a sentiment analysis relative to one or more topics relevant to the managing entity system. In some embodiments, this may include identifying sentiment toward a public figure, such as a business leader, political figure, or the like. In other embodiments, this may include identifying a posturing of an administration toward an issue related to data processing, personal user information, or the like. In still further embodiments, this may include identifying one or more regions, geographical areas, sovereign regions, or the like, which are adverse to the region where the managing entity system is located. In still further embodiments, one or more enacted or passed regulations, laws, policies, or directives may be analyzed in order to identify key requirements or required changes related to data processing, customer communication, resource transfer, resource transfer reporting, or the like. As shown in block 202, any of these topics may be identified as relevant events, sentiments, or policy changes.

As further shown in block 203, the system proceeds by accessing the process flow log 142 in order to identify and determine potential impacts to managing entity system workflows, process controls, or the like. For instance, if a policy is identified which requires the managing entity to increase reporting related to the transfer or storage of user data, the system may identify all process flows within the managing entity which house or handle user data. In some embodiments, multiple systems may interact in order to update user data or utilize it in order to customize user preferences and tailor a user experience with the managing entity systems. In this instance, the system may identify all processes which utilize user data in order to identify if any changes to the handling or storage of data are necessary to comply with the updated policy identified by the system.

In other embodiments, a relevant sentiment toward a public figure may be identified by the system. For instance, a governing body may publish information which effectively adds a public to a restricted list or identifies them as potentially malfeasant actor. In this instance, the system may identify this negative sentiment by conducting a contextual natural language processing analysis and infer that any resource accounts associated with the public figure should be monitored for unusual activity, essentially proactively inferring that the managing entity may be approached by a regulatory body to produce relevant information on the individual, and therefore the system may recommend a more stringent monitoring or data collection on the particular resource account or accounts associated with the public figure. The system may access the process flow log to determine potential lines of business which interact with resource accounts associated with the public figure.

As further shown in block 204, the system may proceed by automating a responsive action once relevant process flows and control systems are identified. A number of examples of automated responsive actions 204 are show in FIG. 2; however, it is understood that this list is not exhaustive. As shown in block 205, the system may automate a responsive action by creating a working group with proposed changes to policy implementations. In other embodiments, the system may identify that there is a single user which is a process owner, or person in control of engineering or authorizing process flow changes and may notify that individual directly. In some embodiments, where there are multiple users identified as being connected to a relevant process flow, or in instances where there are multiple process flow controls which interact and are managed by different users, the system may create a working group to automate the organization and collaboration of these users. For instance, in instances where a public figure is identified as a potentially malfeasant actor, the system may identify that the public figure maintains a personal account, associated with one set of process controls at the managing entity, and also oversees one or more corporate resource accounts, associated with a second set of process controls or lines of business at the managing entity. In this instance, the system may determine that it is necessary to monitor all resource activities which are associated with the particular individual in question, and may automate the creation of a working group by sending an automated message to one or more supervising users of each process flow with details on the identified sentiment or directive, and recommendations for increased monitoring, restricted resource account access, or heightened security measures to be taken before resources are transacted from accounts associated with the individual in question.

In similar embodiments, the system may instead automate a responsive action by simply degrading or monitoring business-to-business (B2B) connections with a third-party system based on the contextual analysis output, as shown in block 206. For instance, if a business or third-party entity is identified as adverse to the region where the managing entity is located, the system may identify that the managing entity is at increased chance of exposure or negative impact based on a current relationship or data sharing relationship with that third party entity. For instance, current events may indicate that there is a conflict between two regions, and there is an increased chance of unauthorized cyber activity with a region identified as adverse to the region of the managing entity. In this instance, the system may automatically degrade or monitor any communications, service requests, data access, or the like, of third-party entities located in the adverse region. In other embodiments third-party systems may be labeled in a similar manner by nature of their association with one or more individuals identified by an official government entity as being restricted or malfeasant actors. For instance, one or more individuals which are in managing roles at a third-party entity system may be identified as being malfeasant actors, which the system may contextualize to determine that the associated third-party entity itself may be a channel for unauthorized access, and therefore the system may automatically degrade or monitor B2B connections with the third-party system for some time period until one or more users of the managing entity system can conduct a thorough review. In this way, the system may proactively protect the managing entity system from any unauthorized activity until a human user can review the internal processes and controls to determine if there is any actual chance of negative impact.

Next, as shown in block 207, the system may take an automated responsive action by placing a restrictive hold on resource transfers from one or more accounts for a given time period according to contextual analysis output. For instance, if current events or external intelligence data feeds indicate that a particular individual is being restricted by an official entity, the system may place an automatic hold on resource transfers from any accounts associated with the individual in question until the proper authorities have been contacted to determine a further course of action. In some embodiments, the restrictive hold on resource transfers may be temporary only until a follow-up review can be conducted to determine the actual chance of any negative impact or resource loss occurring. In still further embodiments, as shown in block 208, the system may modify a cloud environment, virtual machine permissions, or user permission to access certain information or data. For instance, if a particular region is determined to be adverse to the region where the managing entity is located, the system may determine that there are one or more users employed by the managing entity which are located in the adverse region. In such instances, it may be prudent to limit access to certain information by users located in the adverse region, or require a re-authentication from users located in the adverse region in order to ensure that communications monitored in the adverse region do not lead to unauthorized dissemination of sensitive information. In other embodiments, a cloud environment or virtual machine environment may be automatically altered to reduce access permissions to certain file directories, proprietary applications, resource accounts, user data, or the like.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for event based network micro-segmentation modeling, the system comprising:
    at least one non-transitory storage device computer-readable program code stored thereon; and
    at least one processing device coupled to the at least one non-transitory storage device, wherein the at least one processing device is configured to execute the computer-readable program code to:
    continuously monitor one or more external intelligence data feeds;
    identify one or more events, sentiments, or policy changes as relevant to an entity workflow;
    access a process flow log to determine one or more process controls impacted by the identified one or more events, sentiments, or policy changes; and
    automate a responsive action or communication notifying one or more users of the one or more process controls impacted by the identified one or more events, sentiments, or policy changes, wherein the responsive action further comprises degrading data transmissions with one or more third party entities and modifying a cloud environment of a particular region associated with the one or more third party entities.

2. The system of claim 1, wherein the processing device is further configured to automate a simulated process control environment to determine one or more auxiliary impacts caused by changing one of the one or more process controls.

3. The system of claim 1, wherein the identified one or more events, sentiments, or policy changes are determined based on contextual analysis of natural language via a machine learning engine.

4. The system of claim 1, wherein the responsive action further comprises generating a working group of one or more users identified as supervising one of the one or more process controls.

5. The system of claim 1, wherein the responsive action further comprises placing a restrictive hold on resource transfers to or from one or more resource accounts for a defined time period.

6. The system of claim 1, wherein the responsive active further comprises modifying user access permissions of one or more users to limit the users' access to one or more proprietary applications or confidential datastores.

7. A computer program product for event based network micro-segmentation modeling, the computer program product comprising a non-transitory computer-readable medium comprising code causing an apparatus to:
    continuously monitor one or more external intelligence data feeds;
    identify one or more events, sentiments, or policy changes as relevant to an entity workflow;
    access a process flow log to determine one or more process controls impacted by the identified one or more events, sentiments, or policy changes; and
    automate a responsive action or communication notifying one or more users of the one or more process controls impacted by the identified one or more events, sentiments, or policy changes, wherein the responsive action further comprises degrading data transmissions with one or more third party entities and modifying a cloud environment of a particular region associated with the one or more third party entities.

8. The computer program product of claim 7, wherein the processing device is further configured to automate a simulated process control environment to determine one or more auxiliary impacts caused by changing one of the one or more process controls.

9. The computer program product of claim 7, wherein the identified one or more events, sentiments, or policy changes are determined based on contextual analysis of natural language via a machine learning engine.

10. The computer program product of claim 7, wherein the responsive action further comprises generating a working group of one or more users identified as supervising one of the one or more process controls.

11. The computer program product of claim 7, wherein the responsive action further comprises placing a restrictive hold on resource transfers to or from one or more resource accounts for a defined time period.

12. The computer program product of claim 7, wherein the responsive active further comprises modifying user access permissions of one or more users to limit the users' access to one or more proprietary applications or confidential datastores.

13. A computer-implemented method for event based network micro-segmentation modeling, wherein the computer-implemented method comprises:
    providing a computing system comprising a computer processing device and a non-transitory computer readable medium, where the computer readable medium comprises configured computer program instruction code, such that when said instruction code is operated by said computer processing device, said computer processing device performs the following operations:

identifying one or more parameters associated with the one or more data transfers; and continuously monitoring one or more external intelligence data feeds;

identifying one or more events, sentiments, or policy changes as relevant to an entity workflow;

accessing a process flow log to determine one or more process controls impacted by the identified one or more events, sentiments, or policy changes; and automating a responsive action or communication notifying one or more users of the one or more process controls impacted by the identified one or more events, sentiments, or policy changes, wherein the responsive action further comprises degrading data transmissions with one or more third party entities and modifying a cloud environment of a particular region associated with the one or more third party entities.

14. The computer-implemented method of claim 13, wherein the processing device is further configured to automate a simulated process control environment to determine one or more auxiliary impacts caused by changing one of the one or more process controls.

15. The computer-implemented method of claim 13, wherein the identified one or more events, sentiments, or policy changes are determined based on contextual analysis of natural language via a machine learning engine.

16. The computer-implemented method of claim 13, wherein the responsive action further comprises generating a working group of one or more users identified as supervising one of the one or more process controls.

17. The computer-implemented method of claim 13, wherein the responsive action further comprises placing a restrictive hold on resource transfers to or from one or more resource accounts for a defined time period.

* * * * *